United States Patent
Riedel

[15] 3,662,971
[45] May 16, 1972

[54] FILM THREADING AND TRANSPORTING MECHANISM FOR USE IN CINEMATOGRAPHIC APPARATUS

[72] Inventor: Wolfgang Riedel, Winnenden, Germany
[73] Assignee: Silma S.p.A., Rivoli Torinese, Italy
[22] Filed: Jan. 18, 1971
[21] Appl. No.: 107,363

[30] Foreign Application Priority Data
Jan. 29, 1970   Germany ..................... P 20 03 957.0

[52] U.S. Cl. ................................. 242/192, 226/91, 352/157
[51] Int. Cl. ......................................................... G03b 1/58
[58] Field of Search ..................... 226/91, 90; 352/157, 158; 242/192

[56] References Cited

UNITED STATES PATENTS 3,550,879  12/1970  Bundschuh ........................... 242/192
3,558,077  1/1971   Heinen .............................. 352/157 X

*Primary Examiner*—Richard A. Schacher
*Attorney*—Michael S. Striker

[57] ABSTRACT

A film threading and transporting mechanism for use in motion picture projectors wherein the supply reel is rotatable by a drive to pay out the film and wherein the leader of the film is deflected into a channel to advance toward the pull-down. A film transporting wheel is mounted adjacent to the channel and is rotated by the drive when the latter ceases to rotate the supply reel. The drive has a torque transmitting unit mounted on a carrier which is pivotable between a first position wherein a first rotary element of the torque transmitting unit rotates the supply reel in a direction to pay out the film and a second position wherein a second rotary element of the torque transmitting unit drives the film transporting member which then overcomes friction between the supply reel and its spindle and/or between the marginal portion of convoluted film and the flanges of the supply reel to prevent undue tensioning of film by the pull-down. The carrier tends to assume its second position when the first rotary element of the torque transmitting unit rotates in a direction to drive the supply reel so that the latter pays out the film, and is movable from such second position in response to the application of finger pressure which must overcome the resistance of an elastic follower mounted in the housing of the motion picture projector.

14 Claims, 2 Drawing Figures

Patented May 16, 1972

3,662,971

INVENTOR
Wolfgang RIEDEL

By his ATTORNEY

FILM THREADING AND TRANSPORTING MECHANISM FOR USE IN CINEMATOGRAPHIC APPARATUS

BACKGROUND OF THE INVENTION

The present invention relates to improvements in mechanism for threading and transporting the film between a supply reel and a takeup reel in cinematographic apparatus, especially in motion picture projectors. More particularly, the invention relates to improvements in film threading and transporting mechanisms of the type wherein a roll of convoluted motion picture film on the core of the supply reel can be rotated by a drive while a suitably configurated and mounted film directing member intercepts and deflects the leader of motion picture film into a channel wherein the film is caused to advance past a film feeding device, normally a claw pull-down, and on toward the core of the takeup reel. As a rule, the drive is or need be operated to rotate the supply reel only until the leader of the film reaches the pull-down; the latter thereupon takes over and starts to feed the leader and the major part of the film toward the takeup reel. Disengagement of the drive from the supply reel when the pull-down begins to feed the film is desirable in order to insure that the film can advance at the speed which is determined by the pull-down.

Friction which develops between the supply reel and its spindle as well as between the marginal portions of convoluted film and the flanges of the supply reel frequently offers to the unwinding of film a substantial resistance so that the pull-down must draw the film with a force which might cause damage to film in the region of perforations. Moreover, excessive resistance which the film offers to the feeding action of the pull-down can generate undesirable noise and can prevent the pull-down from placing successive film frames into accurate registry with the projection gate.

In order to prevent the film from offering excessive resistance to the feeding action of the pull-down, certain motion picture projectors employ a film transporting roller or wheel which is mounted adjacent to the path of the film between the supply reel and the pull-down. The transporting roller is driven by the motor of the motion picture projector to draw the film off the supply reel and to thus reduce the likelihood of excessive tensioning of film by the claw of the pull-down. Reference may be had, for example, to Swiss Pat. No. 472,043 which discloses such a film transporting roller and a motor serving to drive the transporting roller as well as the supply reel. A first transmission receives motion from the output shaft of the motor and rotates the supply reel while a discrete second transmission serves to rotate the film transporting roller. Both transmissions begin to rotate the respective parts in response to starting of the motor but the first transmission can be disengaged from the supply reel when the threading of the leader of convoluted film has progressed to the extend necessary to move the film into the range of the pull-down. The second transmission remains operative and drives the film transporting roller at a speed which is desirable to avoid excessive tensioning of the film between the supply reel and the pull-down. Once the first transmission is disengaged, the supply reel rotates at the speed which is determined by the pull exerted upon motion picture film by the transporting roller which continues to be driven by the second transmission.

A drawback of the just described conventional film threading and transporting mechanism is that it is rather complicated, bulky and comprises a substantial number of parts. Moreover, the cinematographic apparatus must embody means for interrupting the driving connection between the motor and the film transporting roller or for disengaging the transporting roller from the film prior to start of a rewinding operation during which the supply reel is normally rotated at a high speed to complete the collection of film within a short interval of time. This, too, contributes to the bulk, complicatedness and cost of such film threading and transporting mechanisms.

SUMMARY OF THE INVENTION

An object of the invention is to provide a novel and improved film threading and transporting mechanism which prevents excessive tensioning of motion picture film by the claw of the pull-down or an analogous film feeding device and which is simpler, more compact and less prone to malfunction then presently known film threading and transporting mechanisms.

Another object of the invention is to provide a cinematographic apparatus, particularly a motion picture projector, with novel means for driving the transporting member which draws motion picture film off the supply reel during normal operation of the apparatus.

A further object of the invention is to provide the film threading and transporting mechanism with novel means which is capable of automatically insuring that the film transporting member cannot interfere with rapid rewinding of film onto the supply reel.

An additional object of the invention is to provide a film threading and transporting mechanism with novel means for driving the film transporting member at the time when the supply reel is not positively driven to pay out the film, and for automatically terminating the transmission of torque to the film transporting member when the supply reel is driven, either directly or by way of the roll of film which is convoluted on its core.

Another object of the invention is to provide a reliable drive which forms part of the improved film threading and transporting mechanism and can serve to transmit motion to various parts in a space and material saving manner, and which can be incorporated in sophisticated as well as in popularly priced cinematographic apparatus.

In accordance with the present invention, the cinematographic apparatus comprises a housing which can support a rotary supply reel containing a supply of convoluted motion picture film whose leader constitutes the free end of the outermost convolution on the core of the supply reel, guide means defining a path wherein the leader is caused to advance lengthwise in response to rotation of the supply reel in a direction to pay out the film, the guide means comprising a rotary film transporting member (such as a friction roller or wheel) which is adjacent to the path and is mounted between the supply reel and a customary film feeding device (e.g., a conventional claw pull-down which can feed the film stepwise to place successive film frames into registry with the gate), and a drive including torque transmitting means movable between a first position in which it rotates the supply reel in a direction to pay out the film so that the leader can enter the path and is caused to advance into the range of the pull-down and a second position in which the torque transmitting means rotates the film transporting member in a direction to draw the film off the supply reel and to prevent excessive tensioning of film by the claw of the pull-down.

An important advantage of the improved drive is that its torque transmitting means can rotate the film transporting member at the time when the supply reel need not be driven, and that the torque transmitting means preferably automatically moves into driving engagement with the film transporting member when the user of the apparatus detects that the leader of the film has been advanced into the range of the pull-down and ceases to intentionally maintain the torque transmitting means in engagement with the supply reel and/or with the outermost convolution of film on the core of the supply reel.

The novel features which are considered as characteristic of the invention are set forth in particular in the appended claims.

The improved film threading and transporting mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
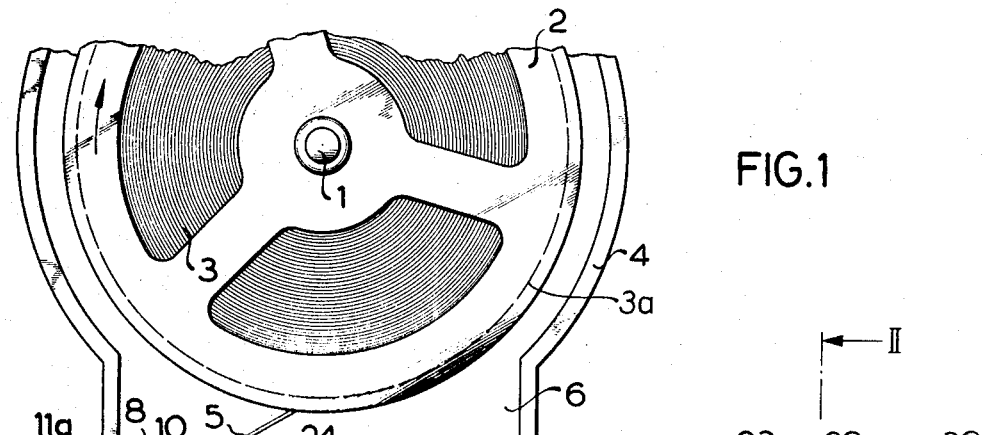
FIG. 1 is a fragmentary schematic side elevational view of a motion picture projector which includes a film feeding and transporting mechanism embodying one form of the invention, the torque transmitting means of the mechanism being shown in the position it assumes when it drives the film transporting member of the guide means.

Referring first to FIG. 1, there is shown a cassette or magazine 4 containing a supply reel 2 for a roll of convoluted motion picture film 3. The core of the reel 2 is mounted on and is rotatable with reference to a spindle 1 which is mounted in or on the housing of a motion picture projector. The housing of the projector includes a wall 12. The lower end of the cassette 4 is open, as at 6, to permit the leader 5 of motion picture film 3 to be threaded through the projector and connected to the core of a takeup reel, not shown.

A film directing and deflecting member 7 is pivotably mounted in the housing of the projector and has a wedgelike film engaging portion or tip 8 whose edge can be moved into engagement with the outer side of the outermost convolution 3a of the roll of film 3 on the core of the supply reel 2. The deflecting member 7 then extends upwardly through the open lower end 6 of the cassette 4. The reel 2 is rotatable in a clockwise direction, as viewed in FIG. 1, to pay out the film whereby the tip 8 of the deflecting member 7 intercepts and deflects the leader 5 so that the latter moves along a film directing surface 9 of the member 7 and toward the takeup reel in response to continued clockwise rotation of the supply reel. The foremost portion of the leader 5 is directed by the surface 9 into a relatively narrow path or channel 10 which is defined by a plate 11 secured to the wall 12 by screws or analogous fasteners 11a which can be provided with distancing rings (not shown) in order to maintain the plate 11 in parallelism with the wall 12 and to insure that the parts 11, 12 define a clearance or gap permitting pivotal movements of a supporting arm 13 which carries the deflecting member 7. The outer end portion of the arm 13 has a bent-over projection or lug 14 constituting an abutment or stop for a pin 15 at the lower end of the deflecting member 7. The pin 15 is connected to one end of a helical spring 16 the other end of which is connected to a post 13a of the arm 13 so that the spring 16 tends to move the deflecting member 7 with reference to the arm 13 in an upward direction, as viewed in FIG. 1, and to maintain the pin 15 in abutment with the stop 14. The plate 11 is formed with an arcuate recess 11b which receives and guides the deflecting member 7 during movement with or relative to the arm 13 and toward or away from the outermost convolution 3a. The center of curvature of the recess 11b is located on the pivot axis for the arm 13. The plate 11 supports the shaft 17 for a rotary film transporting member here shown as a roller or wheel 18 which is adjacent to the lower end of the path 10 opposite the deflecting member 7. The peripheral surface of the film transporting member 18 is contacted by the film 3 while the latter moves lengthwise toward the takeup reel or back toward the supply reel 2, i.e., during projection of images of successive film frames onto a screen, not shown, and during rewinding of film onto the core of the supply reel 2. The plate 11 and the wheel 18 form part of a film guide which further comprises a loop-forming leaf spring 19 serving to guide the forward end of the leader 5 into the range of a customary film feeding device here shown as a pull-down 20 having a claw which can enter the perforations of film 3 to feed the film stepwise and to thus place successive film frames into registry with the projection gate, not shown.

The drive for rotating the supply reel 2 in a clockwise direction during threading of the leader 5 through the projector includes a rotary element here shown as a friction wheel or roller 24 which forms part of a torque transmitting unit of the drive and is rotatable on a shaft 24a mounted on an arm 28 of a pivotable carrier 21. The aforementioned arm 13 also forms part of or is connected with the carrier 21. The element 24 is rotatable by an endless flexible member here shown as a belt or cord 22 which is further trained over a driver pulley 23 and is tensioned by a roll 31 mounted on a shaft 33 which is secured to the carrier 21. The carrier 21 can pivot about the axis of the driver pulley 23 to move the belt 22 and/or the element 24 into engagement with the outermost convolution 3a whereby the element 24 enters the interior of the cassette 4 through the open lower end 6. The element 24 constitutes the driven pulley of a belt transmission which includes the parts 22–24.

The pulley 23 is fixedly secured to a rotary member or shaft 25 which is driven by the output shaft of a prime mover here shown as a reversible electric motor 27 by way of a transmission 26 which is indicated by broken lines. The shaft 25 can be considered as forming part of the transmission 26. This transmission can further include a train of gears or a belt drive. The carrier 21 has a third arm 29 which is provided with a depressible actuating transporting here shown as a knob 30 which can be moved downwardly, as viewed in FIG. 1, to thereby pivot the carrier 21 in a clockwise direction from the position shown in FIG. 1 to another position so as to move the belt 22 and/or the element 24 into engagement with the outermost convolution 3a. The arm 29 can be made integral with the arm 13 and/or 28. The arm 28 further supports a rotary element in the form of a friction wheel 32 which bears against and tensions the belt 22 and serves to rotate the film transporting member 18 when the element 24 is disengaged from the film roll 3 on the core of the supply reel 2. The element 32 is rotatable on a shaft 34.

The parts 22, 24, 32 constitute three components of the aforementioned torque transmitting unit which is mounted on the carrier 21 and is movable with the carrier between a first position in which the element 24 rotates the supply reel 2 and the illustrated second position in which the element 32 rotates the film transporting member 18. The supply reel 2 (or the roll 3 of film thereon) can be directly engaged by the belt 22 and/or by the peripheral surface of the element 24. It is assumed that the supply reel 2 is to be rotated in a clockwise direction by the belt 22 when the latter is driven by the motor 27 and is caused to bear against the convolution 3a.

The rotary element 32 constitutes that component of the torque transmitting unit which, in accordance with a novel space and material saving feature of my invention, performs a useful function when the belt 22 ceases to rotate the supply reel 2. As mentioned above, the element 32 then engages and rotates the film transporting member 18 which engages the film 3 and causes it to move lengthwise toward the takeup reel. In order to be of assistance in transport of the film 3 toward the takeup reel, the element 32 must rotate in a clockwise direction so as to drive the transporting member 18 in a counterclockwise direction, as viewed in FIG. 1. This necessitates a rotation of the driver pulley 23 and element 24 in a counterclockwise direction.

The carrier 21 is connected with the shaft 25 for the driver pulley 23 by a friction clutch 35 which is capable of pivoting the carrier 21 in response to rotation of the shaft 25. The friction clutch 35 includes a hairpin spring 36 which bears against the periphery of the shaft 25 and has two end portions or legs disposed between two projections or pins 37, 38 of the carrier 21. If the carrier 21 is held against pivotal movement about the axis of the shaft 25 while the motor 27 is on, the shaft 25 rotates with reference to the spring 36.

As mentioned before, the motor 27 which drives the shaft 25 by way of the transmission 26 is of the reversible type so that it can rotate the element 24 in a clockwise direction or in a counterclockwise direction. The shaft 25 is driven in a counterclockwise direction when the belt 22 is to rotate the supply reel 2 in a direction to pay out the film 3. The clutch 35 then tends to pivot the carrier 21 in a counterclockwise direction and to maintain it in the second position shown in FIG. 1 in which the element 32 drives the film transporting member 18.

The speed of the member 18 is synchronized with the speed of feed movement of the pull-down 20. In order to rotate the roll of film 3 in a clockwise direction and to thus move the forward end of the film leader 5 into the range of the tip 8 on the deflecting member 7, the operator must depress the knob 30 before or after the motor 27 is started in a direction to rotate the element 24 in a counterclockwise direction. The clutch 35 then permits the carrier 21 to pivot with reference to the shaft 25 until the belt 22 engages the outermost convolution 3a. When the pressure upon the knob 30 is relaxed, the clutch 35 becomes operative and pivots the carrier 21 in a counterclockwise direction, i.e., back to the second position shown in FIG. 1 in which the element 32 drives the film transporting member 18.

The direction of rotation of the motor 27 is reversed for the purpose of rewinding the film 3 onto the core of the supply reel 2. The shaft 25 then rotates in a clockwise direction and the clutch 35 tends to pivot the carrier 21 in the same direction, i.e., it tends to move the belt 22 into frictional engagement with the outermost convolution 3a of the film 3. The element 32 is then automatically disengaged from the film transporting member 18. This insures that the member 18 is free to be driven by the film 3 at the relatively high speed which is normally desirable for rewinding of film onto the core of the supply reel 2. In order to prevent the belt 22 and/or the element 24 from moving into engagement with the outermost convolution 3a during rewinding, the motion picture projector comprises novel retaining means for maintaining the carrier 21 in an intermediate position in which the element 32 is disengaged from the film transporting member 18 and the belt 22 is disengaged from the outermost convolution 3a. The illustrated retaining means comprises a first retaining portion of follower 39 which is secured to the wall 12 by one or more rivets or analogous fasteners and has a roof-shaped elastic tongue 39a which can track the faces 41, 42 of a suitably configurated cam 40 on the arm 29 of the carrier 21. The cam 40 constitutes a movable second portion of the retaining means. The cam faces 41, 42 are configurated in such a way that, when the tongue 39a of the follower 39 bears against the face 42, it offers a relatively strong resistance to pivotal movement of the carrier 21 in a clockwise direction, as viewed in FIG. 1 (namely, in a direction to move the belt 22 into frictional engagement with the outermost convolution 3a). The tongue 39a offers less resistance to movement of the cam face 41 when the carrier 21 tends to pivot in a counterclockwise direction, as viewed in FIG. 1, so as to move the element 32 into frictional engagement with the film transporting member 18. The last mentioned resistance can be overcome by the clutch 35 which can cause the preferably convex cam face 41 to slide along the tongue 39a. It will be seen that the cam 40 and follower 39 permit the clutch 35 to pivot the carrier 21 to the position shown in FIG. 1 when the shaft 25 is driven in a counterclockwise direction, and that the clutch 35 is incapable of automatically pivoting the carrier 21 in a clockwise direction to such an extent that the belt 22 would engage the outermost convolution 3a while the shaft 25 rotates in a clockwise direction. The carrier 21 then dwells in the aforementioned intermediate position in which the tongue 39a of the follower 39 abuts against the cam face 42 and the shaft 25 rotates with reference to the spring 36. The cam 40 can be caused to clear the tongue 39a and to permit a movement of the belt 22 into engagement with the outermost convolution 3a only in response to the application of finger pressure against the knob 30 whereby the finger pressure must suffice to deform the tongue 39a so that it can be bypassed by the lobe (between the faces 41, 42) of the cam 40.

The operation:

When the projector is not in use, the parts of the film threading and transporting mechanism assume the positions shown in FIG. 1. The tip 8 of the deflecting member 7 is remote from the roll of film 3 and the belt 22 of the torque transmitting unit is disengaged from the outermost convolution 3a.

Figure 2:
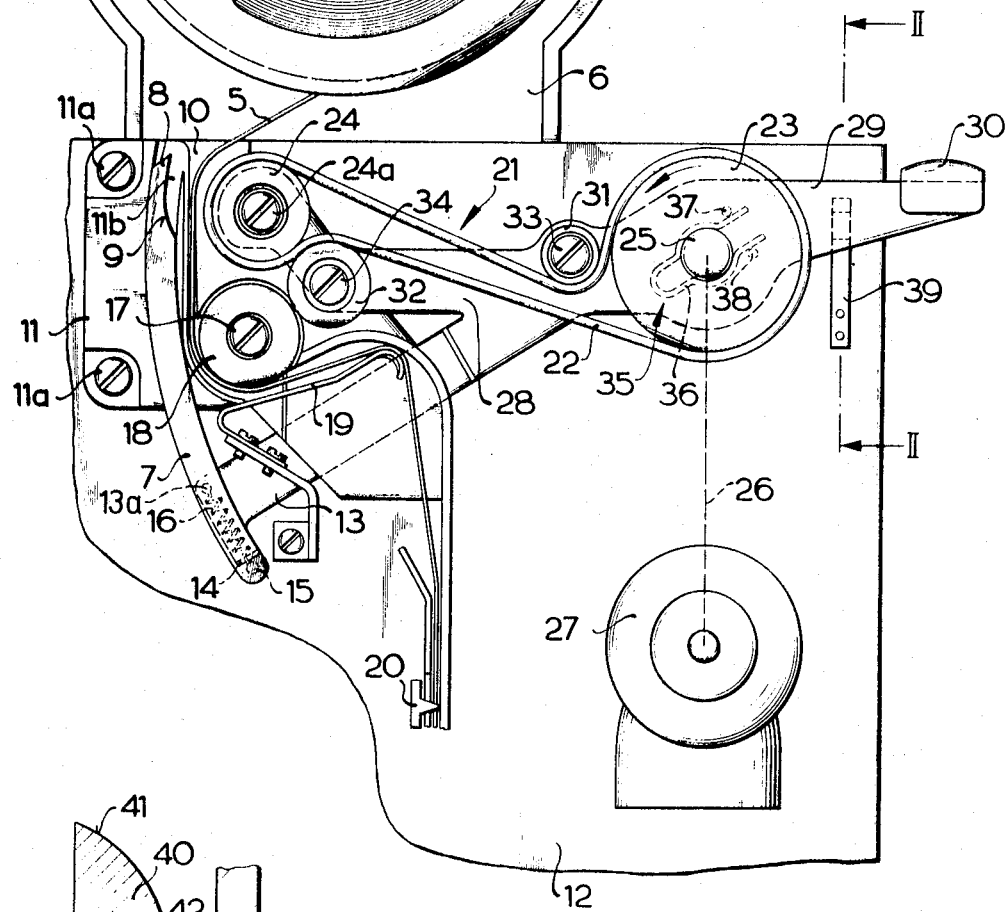
FIG. 2 is an enlarged sectional view of a detail as seen in the direction of arrows from the line II—II of FIG. 1.

In order to start a film threading operation, the user completes the circuit of the motor 27 so that the latter rotates the element 24 in a counterclockwise direction. The shaft 25 also rotates in a counterclockwise direction and the clutch 35 tends to pivot the carrier 21 in an anticlockwise direction so that the element 32 drives the film transporting member 18. The user thereupon depresses the knob 30 so as to overcome the friction between the shaft 25 and clutch spring 36 whereby the belt 22 engages the outermost convolution 3a and rotates the supply reel 2 in a clockwise direction. The tip 8 also moves into engagement with the outermost convolution 3a and intercepts the forward end of the leader 5 so that the leader moves along the film directing surface 9 and advances along the path 10 toward and beyond the film transporting member 18. The forward end of the leader 5 thereupon moves along the spring 19 and into the range of the pull-down 20. The pull-down then starts to feed the film stepwise toward the takeup reel and the user can relax or terminate the pressure upon the knob 30 whereby the clutch 35 immediately pivots the belt 22 and the tip 8 of the deflecting member 7 away from the roll of the film 3. The element 32 returns into driving engagement with the film transporting member 18 which is rotated in a counterclockwise direction to advance the film 3 toward the pull-down 20. While the carrier 21 pivots in a counterclockwise direction, the face 41 of the cam 40 slides along the tongue 39a of the follower 39 and the lobe of the cam 40 can clear the edge of the tongue 39a because the spring 36 is strong enough to effect the necessary deformation of the follower 39. On the other hand, when the user exerts finger pressure on the knob 30, the pressure must be strong enough to effect deformation of the follower 39 while the cam face 42 slides (downwardly as viewed in FIG. 2) along the tongue 39a.

The purpose of the film transporting member 18 is to assist the pull-down 20 by overcoming friction which normally exists between the spindle 1 and the core of the supply reel 2 and/or between the marginal portions of convoluted film 3 and the flanges of the supply reel. Such friction causes the film to bear against the periphery of the transporting member 18 so that the latter produces a necessary pull which moves the film forwardly, namely, toward the pull-down 20. The speed of the belt 22 and the diameters of the element 32 and film transporting member 18 are selected in such a way that the member 18 transports the film 3 at a speed which at least equals the speed at which the film is being fed by the pull-down 20.

In order to rewind the film 3 onto the supply reel 2, the direction of rotation of the motor 27 is reversed and the supply reel 2 is connected with a second transmission, not shown, which preferably derives motion from the motor 27 and rotates the supply reel at a high speed in a counterclockwise direction. The transmission 26 then rotates the shaft 25 in a clockwise direction, as viewed in FIG. 1, and the clutch 35 tends to pivot the carrier 21 in the same direction. However, the face 42 of the cam 40 on the arm 29 of the carrier 21 is then caused to bear against the tongue 39a which does not yield so that the carrier dwells in the aforementioned intermediate position in which the element 32 is disengaged from the film transporting member 18 and the belt 22 is disengaged from the film 3. Therefore, the shaft 25 simply rotates with reference to the carrier 21 and the member 18 is driven by the film 3 at a high speed which is desirable to rapidly rewind the film on the core of the supply reel 2. When the motor 27 is arrested upon completion of the rewinding operation, the element 32 can return by gravity into frictional engagement with the film transporting member 18.

The purpose of the spring 16 is to insure that the belt 22 invariably engages the outermost convolution 3a and rotates the roll of film 3 in a clockwise direction when the user applies finger pressure against the knob 30 so as to move the face 42 of the cam 40 along and beyond the tongue 39a. The mounting of the deflecting member 7 is preferably such that its tip 8 engages the outermost convolution 3a before the convolution 3a is engaged by the belt 22 while the user pivots the carrier 21 in a clockwise direction. When the tip 8 engages the film and the user continues to pivot the carrier 21 in a direction to move the belt 22 into frictional engagement with the outermost convolution 3a, the spring 16 yields and allows the arm 13 of the carrier 21 to pivot about the axis of the shaft 25 while the deflecting member 7 remains at a standstill. The clockwise movement of the carrier 21 is arrested when the belt 22 engages the outermost convolution 3a. This feature is fully described in my copending application Ser. No. 108,406 filed Jan. 21, 1971 and entitled "Film Threading Mechanism For Use In Motion Picture Projectors Or The Like."

An important feature of the improved film threading and transporting mechanism is that a drive which is necessary for automatic threading of the leader 5 can perform another useful function, namely, to drive the film transporting member 18, when the leader of the film has been advanced into the range of the pull-down. Thus, the drive for the supply reel is in use during threading (during rotation of the supply reel to pay out the film) and is thereupon put to use during transport of the major part of motion picture film toward the takeup reel. This brings about substantial savings in space and parts. The manipulation of the improved mechanism is very simple and can be entrusted to inexperienced persons. All that is necessary is to start the motor 27 in the desired direction and to depress the knob 30 in order to start the film threading operation.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, a combination comprising a housing; a reel rotatably supported by said housing and containing a supply of convoluted film whose leader constitutes the free end of the outermost convolution of such supply; guide means defining a path wherein the leader advances in response to rotation of said reel in a direction to pay out the film, said guide means comprising a rotary film transporting member which is adjacent to said path; and a drive including torque transmitting means movable between a first position in which it rotates said reel in said direction and a second position in which it rotates said film transporting member in a direction to draw the film off said reel.

2. A combination as defined in claim 1, wherein said drive further comprises a carrier supporting said torque transmitting means and movable therewith between said first and second positions.

3. A combination as defined in claim 2, wherein said drive further comprises motor means and transmission means connecting said motor means with said torque transmitting means.

4. A combination as defined in claim 2, wherein said torque transmitting means comprises a first driven rotary element which rotates said reel in the first position of said carrier and a second driven rotary element which rotates said film transporting member in the second position of said carrier.

5. A combination as defined in claim 4, wherein one of said rotary elements rotates in response to rotation of the other rotary element.

6. A combination as defined in claim 2, wherein said torque transmitting means comprises a driven pulley, an endless flexible member trained over and arranged to rotate said pulley, and a friction wheel driven by said flexible member, said pulley being arranged to rotate said reel in the first position of said carrier and said friction wheel being arranged to rotate said film transporting member in the second position of said carrier.

7. A combination as defined in claim 2, wherein said torque transmitting means comprises two friction wheels one of which rotates said reel in the first position and the other of which rotates said film transporting member in the second position of said carrier.

8. A combination as defined in claim 2, wherein said drive further comprises a prime mover and a transmission connecting said prime mover with said torque transmitting means, said transmission comprising a rotary member and said carrier being pivotable between said first and second positions about the axis of said rotary member, and further comprising friction clutch means connecting said rotary member with said carrier so that the rotary member tends to pivot said carrier by way of said clutch means.

9. A combination as defined in claim 8, wherein said prime mover is a reversible motor and said clutch means is arranged to automatically move said carrier to said second position in response to rotation of said motor in one direction and to move said carrier toward said first position in response to rotation of the motor in another direction whereby said torque transmitting means is disengaged from said film transporting member.

10. A combination as defined in claim 9, further comprising manually operable actuating means for moving said carrier to said first position against the opposition of said clutch means while said motor rotates in said one direction.

11. A combination as defined in claim 9, further comprising retaining means for arresting said carrier in an intermediate position between said first and second positions against the action of said clutch means while said motor rotates in said other direction.

12. A combination as defined in claim 11, wherein said retaining means comprises a first retaining portion which constitutes a cam and a second retaining portion which constitutes a follower and is arranged to track said cam while said carrier moves between said first and second positions, one of said retaining portions being provided on said carrier and the other retaining portion being adjacent to the path of movement of said one retaining portion.

13. A combination as defined in claim 12, wherein said second retaining portion is yieldable in response to engagement with said first retaining portion.

14. A combination as defined in claim 13, wherein said other retaining portion opposes the movement of said one retaining portion and of said carrier to said first position with a relatively strong force and offers less resistance to movement of said one retaining portion and of said carrier to said second position.

* * * * *